US007133560B2

(12) United States Patent
Lee

(10) Patent No.: US 7,133,560 B2
(45) Date of Patent: Nov. 7, 2006

(54) GENERATING PROCESSING SEQUENCES FOR IMAGE-BASED DECISION SYSTEMS

(76) Inventor: Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 867 days.

(21) Appl. No.: 10/191,925

(22) Filed: Jul. 9, 2002

(65) Prior Publication Data

US 2004/0013306 A1   Jan. 22, 2004

(51) Int. Cl.
*G06K 9/68* (2006.01)
*G06K 9/70* (2006.01)
*G06K 9/62* (2006.01)

(52) U.S. Cl. .................. 382/226; 382/159

(58) Field of Classification Search ........ 382/226–228, 382/155–159
See application file for complete search history.

(56) References Cited

U.S. PATENT DOCUMENTS

| | | | | |
|---|---|---|---|---|
| 5,086,479 A | * | 2/1992 | Takenaga et al. | ........... 382/157 |
| 5,598,076 A | * | 1/1997 | Neubauer et al. | ...... 318/568.22 |
| 5,649,023 A | * | 7/1997 | Barbara et al. | ............. 382/159 |
| 5,661,820 A | * | 8/1997 | Kegelmeyer, Jr. | .......... 382/226 |
| 6,687,404 B1 | * | 2/2004 | Hull et al. | .................. 382/226 |

OTHER PUBLICATIONS

Nefian et al, "An Embedded HMM- Based Approach for face detection and recognition", Mar. 1999, IEEE Acoustics, Speech, and Signal Processing, vol. 6, pp. 3553-3556.*

* cited by examiner

*Primary Examiner*—Joseph Mancuso
*Assistant Examiner*—Kathleen Yuan

(57) ABSTRACT

A multilevel Chain-And-Tree (CAT) model provides a framework to facilitate highly effective image analysis and measurement. Methods are described to automatically or semi-automatically create a processing sequence for image based decision applications using the CAT model framework. The invention supports new image based decision applications with little or no involvement of image processing experts. A new representation for processing sequence is consistent with CAT data representation, which allows easy understanding, updating, and debugging.

3 Claims, 4 Drawing Sheets

GENERATING PROCESSING SEQUENCES FOR IMAGE-BASED DECISION SYSTEMS

TECHNICAL FIELD

This invention relates to a method for automatically or semi-automatically generating processing sequences in image-based decision systems.

BACKGROUND OF THE INVENTION

An image-based decision system processes and extracts information from an image or multiple images to make decisions such as the presence of objects of interest, disease, defects, or the acceptance of measurement parameters such as dimensions, intensity, structures, etc. Image-based decision systems have broad applications such as machine vision, non-contact gauging, inspection, robot guidance, medical imaging, biometrics, etc.

Many image-based decision functions involve the detection of defects or gauging of dimensions from man-made manufacturing components, parts or systems. Simple filtering, thresholding, template matching, golden template comparison and caliper based edge detection are the primary prior art approaches for performing simple machine vision inspection and measurement tasks (Silver, B, "Geometric Pattern Matching for General-Purpose Inspection in Industrial Machine Vision", Intelligent Vision '99 Conference—Jun. 28–29, 1999).

There is often a teaching phase and an application phase for an image-based decision system. In the prior art approach, template region(s) or golden template(s) are selected by human and stored in the system in the teaching phase. In addition, edge detection calipers are specified at image regions of interest for edge detection through multiple one-dimensional projection and simple differentiation filters. In the application phase, template searches are applied to locate the template region(s) in the input image. The located template locations are used to establish a reference coordinate system and/or for deriving points and structures for measurements. Edges are detected from each caliper region and/or Golden template is subtracted from the normalized input image for defect detection or dimensional measurements (Hanks, J, "Basic Functions Ease Entry Into Machine Vision", Test & Measurement World, Mar. 1, 2000 Titus, J, "Software makes machine vision easier", Test & Measurement World, Oct. 15, 2001

Increasing quality and precision requirement in advanced manufacturing demands that quality control procedures be implemented at every stage of the manufacturing process. This requires advanced inspection applications to be deployed in the factory floor by users who have little or no knowledge of image processing/pattern recognition/machine vision technology. Simple prior art algorithms cannot properly address these requirements. There are growing demands of solution products for image-based decisions. A solution product requires little technical knowledge of its users to fully utilize its capabilities. It should allow users to use their application domain knowledge (not detailed image processing and pattern recognition technical knowledge) to optimize the results. Therefore, a solution product should take inputs that link to application knowledge and automatically or semi-automatically translate them into detailed technical processing procedure and parameters without user interaction.

For simple applications, the prior art teaching process requires human selection of template region(s) and the selection and specification of edge calipers and thresholds for measurements. For advanced applications, non-standard processing algorithms are often required using a collection of basic image processing functions. This is mostly performed by experienced image processing and pattern recognition personnel in an ad-hoc fashion. The teaching process is time-consuming and involves mostly artistic trial-and-error rather than a systematic engineering approach. The effectivity of the resulting inspection process is highly dependent on the experience level of the person who sets up the process. This is inconsistent and expensive. Furthermore, the resulting processing sequences and the effects and side-effects of individual operations may not be easily comprehendible. Many operations may be closely linked. Change of one operation may require associated changes of other operations to achieve the effect of change. This requires advanced expert knowledge. The processing sequence may not correlate well to the application requirement or data representation. Therefore, they are difficult to update, change, or debug.

OBJECTS AND ADVANTAGES

An objective of the invention is to create processing sequences for new image based decision applications that are consistent and effective. Another objective of the invention is to support new image based decision applications with little or no involvement of image processing experts. A further objective of the invention is to reduce the time and cost for deploying an image based decision system for a new application. Another objective is to provide a new representation for processing sequence that is consistent with data representation and that allows easy understanding, updating and debugging.

SUMMARY OF THE INVENTION

Working from a reference CAT model and at least one learning image, a processing CAT model is automatically or semi-automatically created. When a processing CAT model processes an input image, it creates a result that is structured similarly to the reference CAT model input, allowing easy comparison and evaluation of results. Processing CAT models are created based upon algorithms contained in a database and the component information contained within the reference CAT model.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

Table 1 shows ROI determination algorithms for some typical relationships;

Table 2 shows algorithms to detect square or rectangular regions;

Table 3 shows feature enhancement options for algorithms for square or rectangular region;

Table 4 shows detection options for algorithms for square or rectangular region;

Table 5 shows pre-processing for algorithms to detect square frame or rectangular frames;

Table 6 shows feature enhancement for algorithms to detect square frames or rectangular frames;

Table 7 shows detection for algorithms to detect square frames or rectangular frames;

Table 8 shows pre-processing options for algorithms to detect circular region;

Table 9 shows feature enhancement options for algorithms to detect circular region;

Table 10 shows detection options for algorithms to detect circular region;

Table 11 shows pre-processing options for algorithms to detect ring;

Table 12 shows feature enhancement options for algorithms to detect ring;

Table 13 shows detection options for algorithms to detect ring;

Table 14 shows pre-processing options for algorithms to detect arc region;

Table 15 shows feature enhancement options for algorithms to detect arc region;

Table 16 shows detection options for algorithms to detect arc region;

Table 17 shows detection options for algorithms to detect arc;

Table 18 shows feature enhancement options for algorithms to detect arc;

Table 19 shows detection options for algorithms to detect arc;

Table 20 shows pre-processing options for algorithms to detect arbitrary shaped region;

Table 21 shows feature enhancement options for algorithms to detect arbitrary shaped region;

Table 22 shows detection options for algorithms to detect arbitrary shaped region;

Table 23 shows pre-processing options for algorithms to detect arbitrary shaped boundary frame;

Table 24 shows feature enhancement options for algorithms to detect arbitrary shaped boundary frame;

Table 25 shows detection options for algorithms to detect arbitrary shaped boundary frame.

DETAILED DESCRIPTION OF THE INVENTION

1. Concept

A multilevel Chain-And-Tree (CAT) model for image based decision was disclosed in U.S. patent application Ser. No. 10/104,669 entitled, "A Multilevel Chain-And-Tree Model for Image-based Decisions" by Shih-Jong J. Lee et. al. filed on Mar. 22, 2002, which is incorporated in its entirety herein. It provides a framework to facilitate highly effective analysis and measurement for advanced image based decision systems. The present invention provides a method that automatically or semi-automatically creates the processing sequence for image based decision applications based on the CAT model framework.

II. Overview

Figure 1:
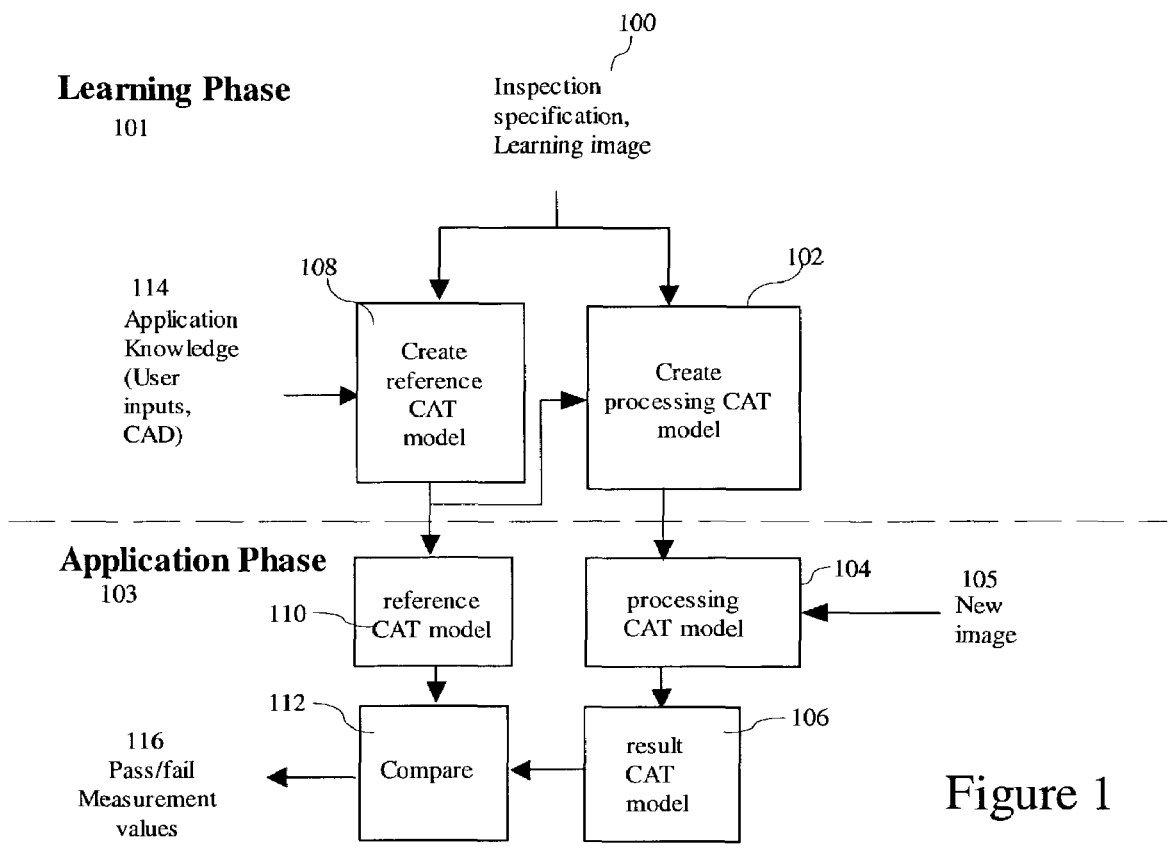
FIG. 1 shows an application scenario of the cat based ID system.

In one embodiment, the application scenario of this invention is shown in FIG. 1. As shown in FIG. 1, a reference CAT model 110 is created 108 using inspection specification and/or learning image 100 and/or application knowledge 114 during the learning phase 101. The inspection specification 100 specifies the desired features for inspection and/or measurements. It could be specified by a user or automatically learned by the system after showing normal and defected images. The application knowledge could be a typical image of the subject, a Computer Aided Design (CAD) model of the subject or entered by the user through a user interface. The reference CAT model 110 consists of the basic structure and attribute values of an ideal subject and its tolerance ranges. A processing CAT model 104 is created 102 from the reference CAT model 108 and/or the inspection specification 100 and/or learning image 100 in the learning phase. The processing CAT model 104 stores the processing algorithm and sequence that will be applied to a new image 105 to create the result CAT model 106 in the application phase.

A result CAT model 106 is used to represent the measurement results of a new image 105. The reference CAT model 110 and result CAT model 106 are compared 112 to determine the pass/fail status of the new image and/or measurement values of image features of interest 116. In one embodiment of the invention, the comparison is a simple check of the measurement results stored in the result CAT model 106 against the tolerance ranges stored in the reference CAT model 110. A new image 105 fails the inspection if any of its measurements 116 is outside the tolerance range. Otherwise, it passes the inspection.

The processing CAT model 104 includes detection methods associated with the CAT component type. For example, caliper edge detection can be associated with a CAT component in a processing CAT model for the detection of a regular shape CAT component such as ring, circle, arc, square, rectangle, and line, etc. A template matching method can be associated with a CAT component in a processing CAT model for the detection of an arbitrary shape CAT component.

In addition, measurement methods are associated with CAT component features. For example, rotation angle, scale, area, shape, density measurement functions can be defined in a processing CAT model to measure the desired features for the result CAT model. The processing CAT model provides a framework to define and execute an image-based decision algorithm. This overcomes the prior-art difficulty of inconsistent ad-hoc algorithm generation. It also provides a direct link between the algorithm representation, the subject, and the result model to facilitate easy comprehension, update, change, and debugging. This invention provides a method for automatic or semi-automatic processing procedure/algorithm generation and algorithm learning under the CAT framework. That is, it provides methods to generate a processing CAT model.

III. Multi-level CAT Model

Figure 2:
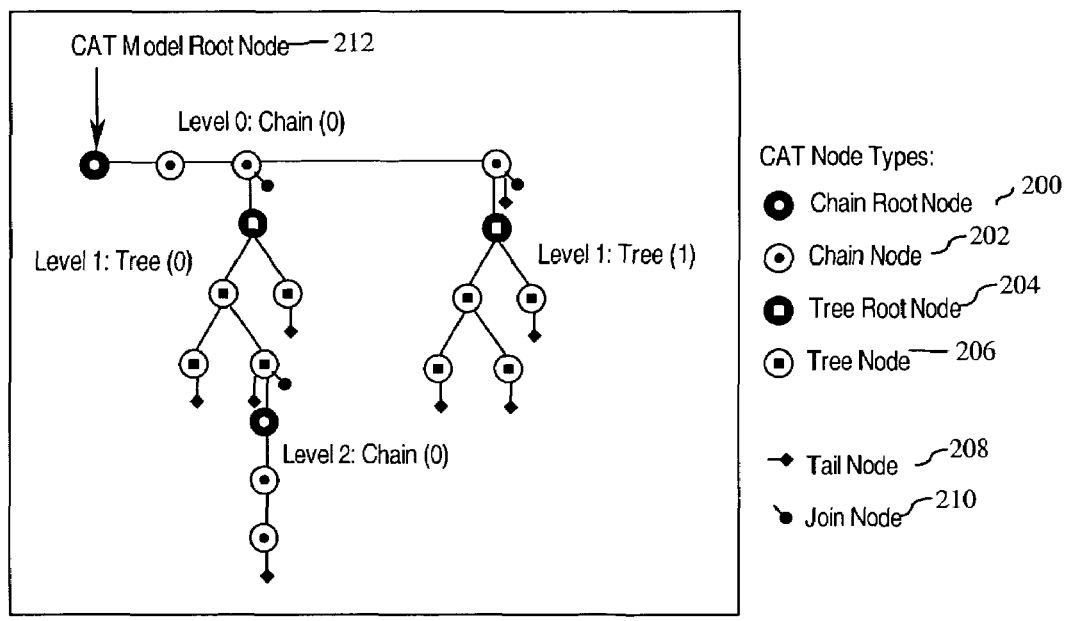
FIG. 2 shows a CAT model illustration.

A multi-level CAT model represents a subject by components and their relations at multiple levels. The relations between components are represented as a chain or a tree link. In one embodiment of the invention, the CAT model is illustrated in FIG. 2.

III.1 CAT Model Elements

A CAT model contains at least one CAT chain or one CAT tree. CAT chains and CAT trees consists of CAT nodes.

A. CAT Node

A CAT node is the basic unit of a CAT model. In one embodiment of the invention, there are four different types of CAT nodes: (1) chain root node 200, (2) chain node 202, (3) tree root node 204, and (4) tree node 206. A CAT node is a Join node 210, if it connects to a chain root node 200 or a tree root node 204 at lower level. A CAT node is a Tail node 208, if it is the last chain node or a terminal node of a tree in a given level. All CAT nodes, except the model root node 212, have one parent node. Each chain node has one child node at the same level, if it is not a tail node. Each tree node has one or more child nodes at the same level, if it is not a tail node. Each CAT node has a "depth" attribute that represents the distance to its chain/tree root node. A root node has the depth of 0, and its children have the depth of 1, and so on.

B. CAT Chain and CAT Tree

A CAT chain contains at least one chain root node plus one or more chain nodes. A CAT tree contains at least one tree root node plus one or more tree nodes. Each CAT chain/tree has a "level" attribute that is the number of root nodes it has to pass through to reach the CAT model root node.

C. CAT Model

A CAT model contains at least one CAT chain or one CAT tree. Each CAT model has one model root node 212 that is either a chain root node 200 or a tree root node 204.

III.2 CAT Component Elements

As described above, a CAT model contains one or more CAT nodes. Each CAT node contains one CAT component that is a part of the object described by the CAT model. In one embodiment of the invention, a CAT component can be specified by its type and attributes as well as its relations.

III.2.1 CAT Component Type

CAT components include simple geometric entities such as ring, circle, arc, square, rectangle, line, text, character, arbitrary shape, or a group of components/CAT.

Those skilled in the art should recognize that other component types could be defined including three-dimensional entities or parts specific to an application such as different types of IC-chips or screws, etc.

III.2.2 CAT Component Features

Each component has associated attributes or features such as locations (centroid, bounding box, etc.), rotation angle, scale, 1-dimensional measurements (width, length, radius, etc.), 2-dimensional measurements (area, etc.), boundary points (link list, boundary point statistics), shape features (compactness, eccentricity, moments, Fourier descriptors, etc.), intensity features (mean density, standard deviation density, integrated density, etc.), texture features (co-occurrence statistics, run-length statistics, fractal dimension statistics, etc.), structure features for children components (number of components, average distance between components, etc.), text content or character value (for text or character components).

A reference CAT model represents an ideal subject and its tolerances. Therefore, its feature attributes include not only the nominal values but also the tolerance ranges. Furthermore, it may store attributes such as template images or valid character sets (for a character component) to facilitate a pass/fail decision. A result CAT model represents an instance of the subject that is measured from the input image. Its feature attributes store the measured values. Additional attributes such as presence/absence of the component can also be included.

Those skilled in the art should recognize that other component features can be defined including color or three-dimensional features or time based features or features specific to an application.

III.2.3 CAT Component Relations

The relations between CAT nodes (such as CAT chains or CAT trees) can be represented by their links. The relations between CAT nodes are associated with the links. Since a CAT node can have only one parent yet it could have multiple children, the relations between nodes can be conveniently specified in the link between a CAT node to its parent node. In one embodiment of the invention, the relations include without limitation:

Distance: The distance between two components
Adjacency: such as touching, overlapping, etc.
InsideOutside: such as inside, outside, etc.
Parallelism
Perpendicularity
Concentricity
BetweenAngle: The angle between component major axes of a child node and its parent node.
AreaRatio: The ratio between component areas of the child node and its parent node.
LengthRatio: The ratio between component major axis lengths of the child node and its parent node.

Those skilled in the art should recognize that other component relations could also be defined including color, three-dimensional relations, time relations, or parts specific relations.

IV. Processing CAT Model Generation

The processing CAT model stores the processing sequence to generate the elements of each CAT component of the result CAT model. A node in a processing CAT model stores detection functions for its CAT component, relation extraction functions to extract its CAT component relational features, detection optimization functions to optimize detection results using CAT component relations and results from related nodes. There are also measurement functions to extract its CAT Component features.

Figure 3:
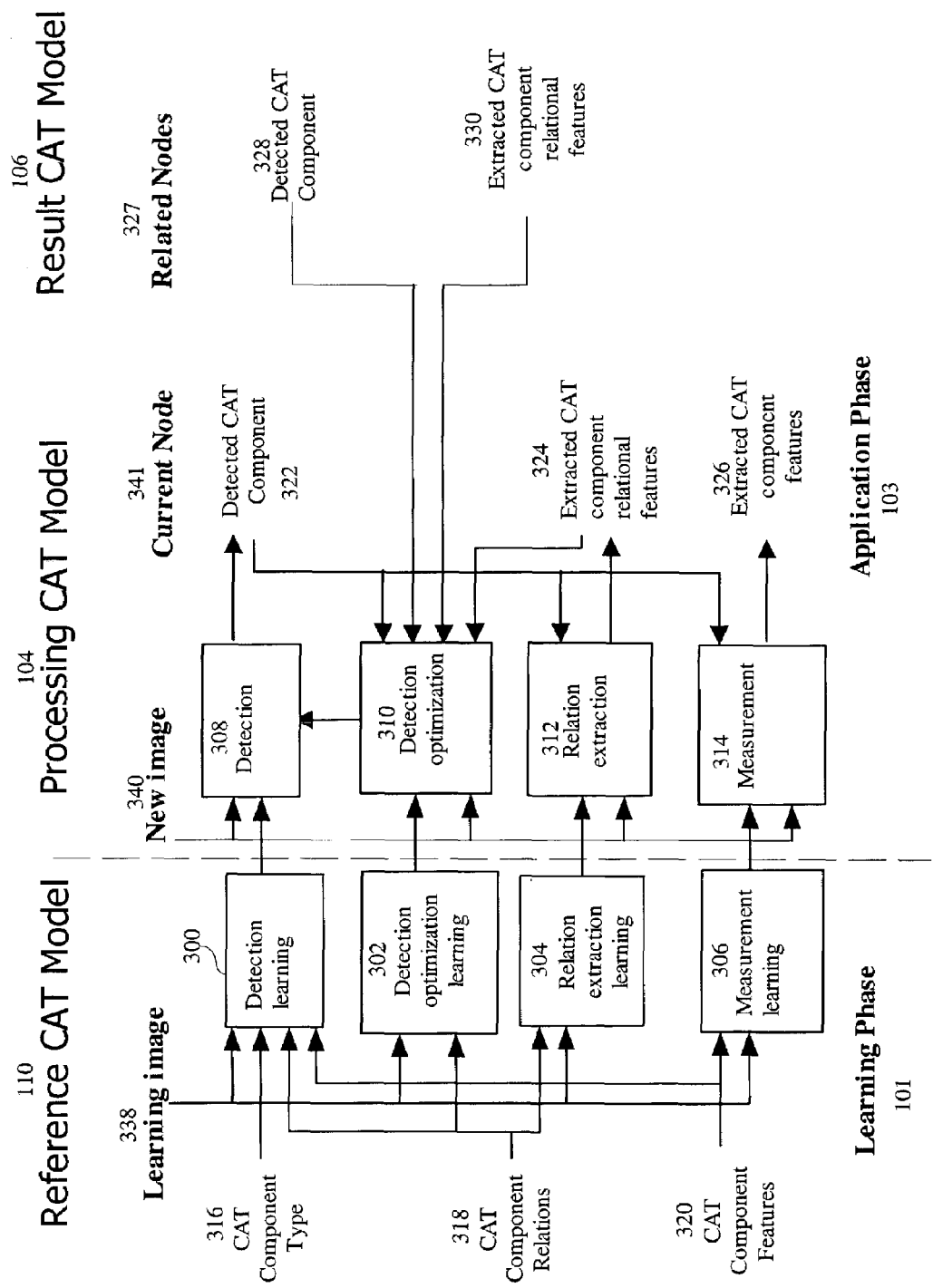
FIG. 3 shows a processing cat model learning and application flow.

FIG. 3 shows the processing CAT model learning and application processing flow. It shows the relations between the processing CAT model 104 and reference CAT model 110 in the learning phase 101 and the processing flow between the processing CAT model and result CAT model in the application phase 103. In the processing CAT model learning phase 101, the detection function for a CAT node 308 is created by a detection learning 300 method of the invention. This method uses the CAT component type 316 and CAT component relations 318 from the reference CAT model 110 as well as the learning image 338 to create the detection sequence for the CAT node 308. The resulting detection function 308 is stored in the processing CAT model 104. A relation extraction learning method 304 of this invention uses the CAT component relations 318 from the reference CAT model 110 and the learning image 338 to create a relation extraction sequence 312 for the CAT node. The resulting relation extraction function 312 is stored in the processing CAT model 104. A detection optimization learning method 302 of this invention uses the CAT component relations 318 from the reference CAT model 110 and the learning image 338 to create the detection optimization processing sequence 310 for the CAT node. The resulting detection optimization function 310 is stored in the processing CAT model 104. A measurement learning method 306 of this invention uses the CAT component features 320 from the reference CAT model 110 and the learning image 338 to create the measurement sequence 314 for the CAT node. The resulting measurement function is stored in the processing CAT model 104.

In the application phase 103, the detection function 308 for a given CAT node is applied to the new image 340 to initially detect the component associated with the node 322. The relation extraction function 312 processes the detected CAT component 322 and the new image 340 to extract CAT component relational features 324. The extracted CAT component relational features 324 and detected CAT component 322 of the current node 341 and the detected CAT component 328 and Extracted CAT component relational features 330 of the related nodes 327 are processed by the detection optimization function 310 to refine the detection results using the relations between the nodes. The detection optimization process 310 is performed by a two-pass dynamic programming like method as described in U.S. patent application Ser. No. 10/178,166 entitled" A Method for Decision Optimization in Image-based Decision Systems" by Shih-Jong J. Lee, et. al. filed Jun. 21, 2002, which in incorporated in its entirety herein. The measurement function 314 processes the detected CAT component 322 and new image 340 to extract CAT component features 326.

A CAT model can be visited sequentially in a forward or backward fashion. The forward direction starts from the root node and traces down the chains and/or trees in a depth first fashion. The backward direction is merely a reversal of the forward direction from tail nodes back to the root node. In one embodiment of the invention, the processing CAT model generation process is performed for each node of a CAT model sequentially in a forward fashion starting from the root node of the CAT model.

Those skilled in the art should recognize that other starting node or method of sequential generation of processing CAT model nodes could be used. They are within the scope of this invention.

IV.1 Detection Learning

The detection learning module determines the processing sequence for detection of a CAT component. The detection processing sequence includes two major steps: (1) detection Region-Of-Interest (ROI) determination (2) object detection. The detection ROI determination process determines the ROI of a component, which is the region of the image where the component is most likely located. To save time and avoid false detection in the preferred embodiment of the invention, the object detection process operates only within the ROI.

IV.1.1 ROI Determination Learning

The ROI determination process relies on the spatial relationship between the component of the current node and the component of a previously detected node. If no relationship exists, the ROI will include all valid regions of the image.

Since a CAT node can have only one parent yet it could have multiple children, the relations between nodes are specified in the link between a CAT node and its parent node. In one embodiment of the invention, the parent node is detected first and the relation between the current node and its parent is used to derive the ROI determination algorithm. A database of algorithms is defined in the learning module. In one embodiment of the invention, the ROI determination algorithms for some typical relationships are defined in Table 1. Table 1 shows possible associated relations between two components. This is an illustrative list and is not exhaustive of the invention possibilities. In the example, two components could be circles having no overlap with known distance between centers, touching, overlapping, they could lie wholly inside or wholly outside of one another. The algorithms used to determine ROI in each case are associated in Table 1. An explanation of the symbology used in this and subsequent tables is included below:

d: distance
c_p: center of the parent component
Circle (d, c_p): a circle of radius d and center c_p
⊕: morphological dilation operation
R_n: expected bounding box region of the current component n
m: the maximum distance from a boundary to the center of the current component n
D_m: a disk of radius m
E: an error rectangle with x and y length corresponding to the expected detection error in x and y
B_p: the boundary where the two components touching each other
O_p: the region(s) where the two components overlapping each other
C_p: the detected parent component region
I: the valid image region Those having ordinary skill in the art should recognize that other relations and algorithms for other relations could be defined. Furthermore, other methods can be used to construct the algorithm.

Figure 4:
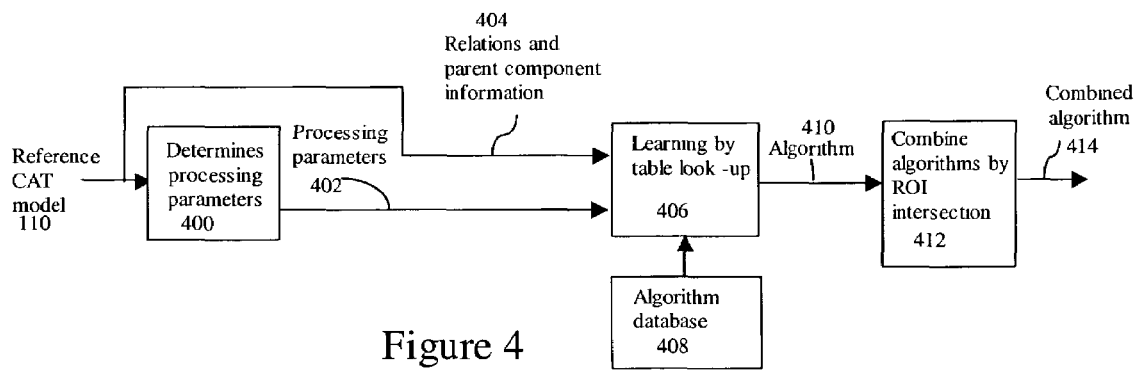
FIG. 4 shows the ROI determination learning processing flow.

The ROI determination learning process is depicted in FIG. 4. The ROI determination learning process determines processing parameters 400 such as R_n, m, Dm and E values (processing parameters 402) using the reference CAT model input 110. It then extracts the relations between a component and its parent component as well as relevant information of the parent component 404 from the reference CAT model 110. Based on the determined and input values and the relations, an algorithm procedure 410 can be learned by table lookup 406 using algorithm database 408. When multiple relationships are defined, multiple procedures are applicable. In this case, all applicable algorithms are included and the intersection 412 of the ROIs from all applicable algorithms is the combined algorithm 414.

IV.1.2 Object Detection Learning

Figure 5:
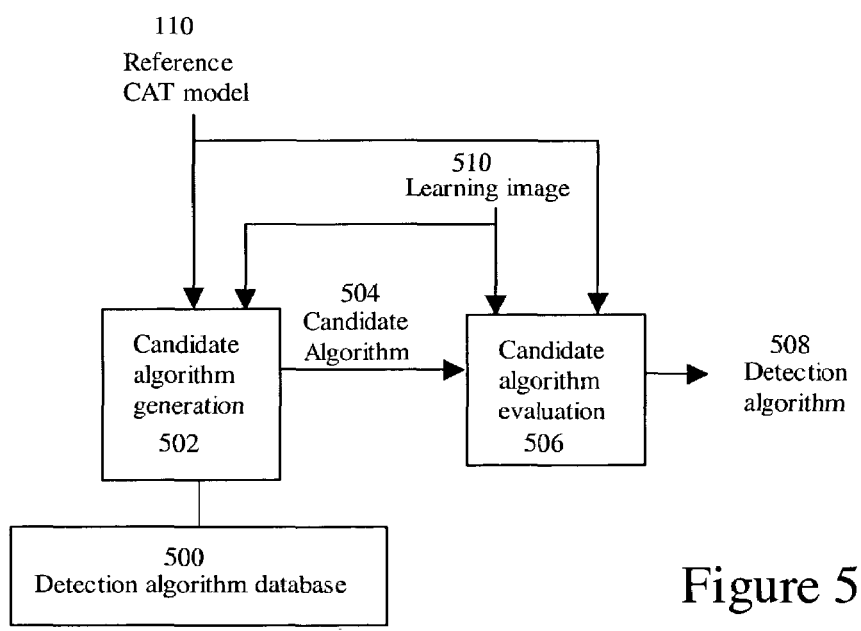
FIG. 5 shows object detection learning processing flow.

The object detection learning processing flow is shown in FIG. 5. The object detection learning module includes a detection algorithm database 500 that stores multiple detection algorithms for incorporation into the detection sequence of a CAT node. For a given CAT node, the reference CAT model 110 specifies its expected CAT component types, expected CAT component features and expected CAT component relations. Based on the expected information of the CAT component, candidate algorithms 502 are generated using the detection algorithm database 500. In one embodiment of the invention, simple algorithms are generated first followed by more sophisticated ones. The candidate algorithms 504 are evaluated by a candidate algorithm evaluation module 506. The module applies the candidate algorithm to the learning image(s) 510. The algorithm application results are compared with the information stored in the reference CAT model 110 to generate a score for the algorithm result. The algorithm scores are used to select the detection algorithm 508 for the current component.

IV.1.2.1 Detection Algorithm Database

The detection algorithm database stores algorithms that can be selected using expected CAT component attributes from the reference CAT model. In addition, learning support image processing may be performed to acquire algorithm selection relevant information that is not available directly in the reference CAT model. There are general algorithms that should be applied to the whole image before the component specific processing is applied such as image calibration and contrast normalization. Image calibration method uses calibration image such as grid patterns with known characteristics to normalize out the geometric distortion of the imaging system. A contrast normalization method adjusts the gain and offset of the image dynamic range to a predefined standard.

The component specific algorithms are specific to each component of the CAT model and are learned using the method of this invention. In one embodiment of the invention, the algorithm database is organized by component type since different algorithms may be required to optimize for detection of different component types.

Given a component type, there are algorithms using different approaches that may be equally applicable or with different effectiveness and limitations. For example, the detection of an object can be accomplished by a region-based algorithm or boundary-based algorithm or a combination of both. Furthermore, specific algorithms optimized for different component conditions such as dark vs. bright objects, textured vs. uniform objects are included for the selection. A typical set of algorithms for a set of typical component types are listed in the following sections.

IV.1.2.1.1 Square or Rectangular Region

The algorithms to detect square or rectangular regions include many choices. In one embodiment of the invention, the algorithm includes pre-processing, feature enhancement and detection steps.

A. Pre-processing

The pre-processing step performs image noise removal. This results in a noise removed image for the feature enhancement step. Table 2 shows example pre-processing operations that can be selected for different component conditions. An explanation of the symbology used in this and subsequent tables is included below:

I is the input image for the processing type;
I_out is the output image for the processing type;
Median filter(I) is a median filtering of I by a small size kernel such as 3 by 3;
Automatic filtering performs automatic filtering for feature enhancement as described in Lee, S, Oh, S, Huang, C "Structure-guided Automatic Learning for Image Feature Enhancement", U.S. patent application Ser. No. 09/815,466, filed May 23, 2001;
Direction 1: the first side direction of the rectangular region;
Direction 2: the second side direction of the rectangular region. It is orthogonal to Direction 1;
E1_m is an elongated structuring element [Lee, 2000] of length m that is orthogonal to Direction 1;
E2_m is an elongated structuring element [Lee, 2000] of length m that is orthogonal to Direction 2;
L1 is a sufficiently large length such as half of the rectangle side length in Direction 1;
L2 is a sufficiently large length such as half of the rectangle side length in Direction 2;
$\ominus$ is the grayscale morphological erosion operation [Sternberg, 1986];
$\oplus$ is the grayscale morphological dilation operation;
$\bigcirc$ is the grayscale morphological opening operation [Sternberg, 1986];
● is the grayscale morphological closing operation;
MAX(I1, I2) performs a maximum function between each pixel of images I1 and I2;

"No Operation" means skip the pre-processing step;
[Lee, 2000] is Lee, S, Oh, S, Huang, C "Structure-guided Image Processing and Image Feature Enhancement", U.S. patent application Ser. No. 09/738,846, filed Dec. 15, 2000;
[Sternberg, 1986] is Sternberg, S R, "Gray-scale morphology," Comput. Vision, Graphics Image Processing, vol. 35:333–355, 1986.

B. Feature Enhancement

The feature enhancement step enhances the feature of interest. This results in a feature enhanced image for the detection stage. Table 3 shows example feature enhancements suitable for algorithms used to detect square or rectangular regions applicable for particular associated component conditions.

C. Detection

The detection step performs object detection that outputs the detected object mask or the location, size and orientation of the component with respect to a template. Table 4 shows example detection stage processing types that can be associated with square or rectangular region detection.

IV.1.2.1.2 Square Frame or Rectangular Frame

The algorithms to detect square frame or rectangular frame include many choices. In one embodiment of the invention, the algorithm includes pre-processing, feature enhancement and detection steps.

A. Pre-processing

The pre-processing step performs image noise removal. This results in a noise-removed image for the feature enhancement step. Table 5 shows example processing types available for pre-processing for square frame or rectangular frame detection.

B. Feature Enhancement

The feature enhancement step enhances the feature of interest. This results in a feature enhanced image for the detection stage. Table 6 shows example processing types available for feature enhancement for square frame or rectangular frame detection.

C. Detection

The detection step performs object detection that outputs the detected object mask or the location, size and orientation of the component with respect to a template. Table 7 shows example processing types available for detection for square frame or rectangular frames.

IV.1.2.1.3 Circular Region

The algorithms to detect circular region include many choices. In one embodiment of the invention, the algorithm includes pre-processing, feature enhancement and detection steps.

A. Pre-processing

The pre-processing step performs image noise removal. This results in a noise-removed image for the feature enhancement step. Table 8 shows example processing types available for pre-processing for circular region detection.

B. Feature Enhancement

The feature enhancement step enhances the feature of interest. This results in a feature enhanced image for the detection step. Table 9 shows example processing types available for feature enhancement for circular region detection.

C. Detection

The detection step performs object detection that outputs the detected object mask or the location, size and orientation of the component with respect to a template. Table 10 shows example processing types available for detection of circular regions.

IV.1.2.1.4 Ring

The algorithms to detect ring include many choices. In one embodiment of the invention, the algorithm includes pre-processing, feature enhancement and detection steps.

A. Pre-processing

The pre-processing step performs image noise removal. This results in a noise-removed image for the feature enhancement step. Table 11 shows example processing types available for pre-processing for ring detection.

B. Feature Enhancement

The feature enhancement step enhances the feature of interest. This results in a feature enhanced image for the detection step. Table 12 shows example processing types available for feature enhancement for ring detection.

C. Detection

The detection step performs object detection that outputs the detected object mask or the location, size and orientation of the component with respect to a template. Table 13 shows example processing types available for detection of rings.

IV.1.2.1.5 Arc Region

The algorithms to detect arc region include many choices. In one embodiment of the invention, the algorithm includes pre-processing, feature enhancement and detection steps.

A. Pre-processing

The pre-processing step performs image noise removal. This results in a noise removed image for the feature enhancement step. Table 14 shows example processing types available for pre-processing for arc region detection.

B. Feature Enhancement

The feature enhancement step enhances the feature of interest. This results in a feature enhanced image for the detection step. Table 15 shows example processing types available for feature enhancement for arc region detection.

C. Detection

The detection step performs object detection that outputs the detected object mask or the location, size and orientation of the component with respect to a template. Table 16 shows example processing types available for detection of arc regions.

IV.1.2.1.6 Arc

The algorithms to detect arc include many choices. In one embodiment of the invention, the algorithm includes pre-processing, feature enhancement and detection steps.

A. Pre-processing

The pre-processing step performs image noise removal. This results in a noise-removed image for the feature enhancement step. Table 17 shows example processing types available for pre-processing for arc detection.

B. Feature Enhancement

The feature enhancement step enhances the feature of interest. This results in a feature enhanced image for the detection step. Table 18 shows example processing types available for feature enhancement for arc region detection.

C. Detection

The detection step performs object detection that outputs the detected object mask or the location, size and orientation of the component with respect to a template. Table 19 shows example processing types available for detection of arcs.

IV.1.2.1.7 Arbitrary Shape Region

The algorithms to detect arbitrary shape region include many choices. In one embodiment of the invention, the algorithm includes pre-processing, feature enhancement and detection steps.

A. Pre-processing

The pre-processing step performs image noise removal. This results in a noise-removed image for the feature enhancement step. Table 20 shows example processing types available for pre-processing for arbitrary shape region detection.

B. Feature Enhancement

The feature enhancement step enhances the feature of interest. This results in a feature enhanced image for the detection step. Table 21 shows example processing types available for feature enhancement for arbitrary shape region detection.

C. Detection

The detection step performs object detection that outputs the detected object mask or the location, size and orientation of the component with respect to a template. Table 22 shows example processing types available for detection of arbitrary shape regions.

IV.1.2.1.8 Arbitrary Shape Boundary Frame

The algorithms to detect arbitrary shape boundary frame include many choices. In one embodiment of the invention, the algorithm includes pre-processing, feature enhancement and detection steps.

A. Pre-processing

The pre-processing step performs image noise removal. This results in a noise-removed image for the feature enhancement step. Table 23 shows example processing types available for pre-processing for arbitrary shape boundary frame detection.

B. Feature Enhancement

The feature enhancement step enhances the feature of interest. This results in a feature enhanced image for the detection step. Table 24 shows example processing types available for feature enhancement for arbitrary shape boundary frame detection.

C. Detection

The detection step performs object detection that outputs the detected object mask or the location, size and orientation of the component with respect to a template. Table 25 shows example processing types available for detection of arbitrary shape boundary frames.

Those skilled in the art should recognize that the list of component types and associated algorithms are not exhausted. For example, the method disclosed in a patent application entitled "Robust method for automatic reading of skewed, rotated or partially obscured characters" U.S. patent application Ser. No. 09/775,954 can be used for the detection of text region and characters. It is expected that there are variations according to specific applications. The essence of the invention does not tie to specific algorithms included in the database. It broadly covers different component types and algorithms.

IV.1.2.2 Candidate Algorithm Generation

Figure 6:
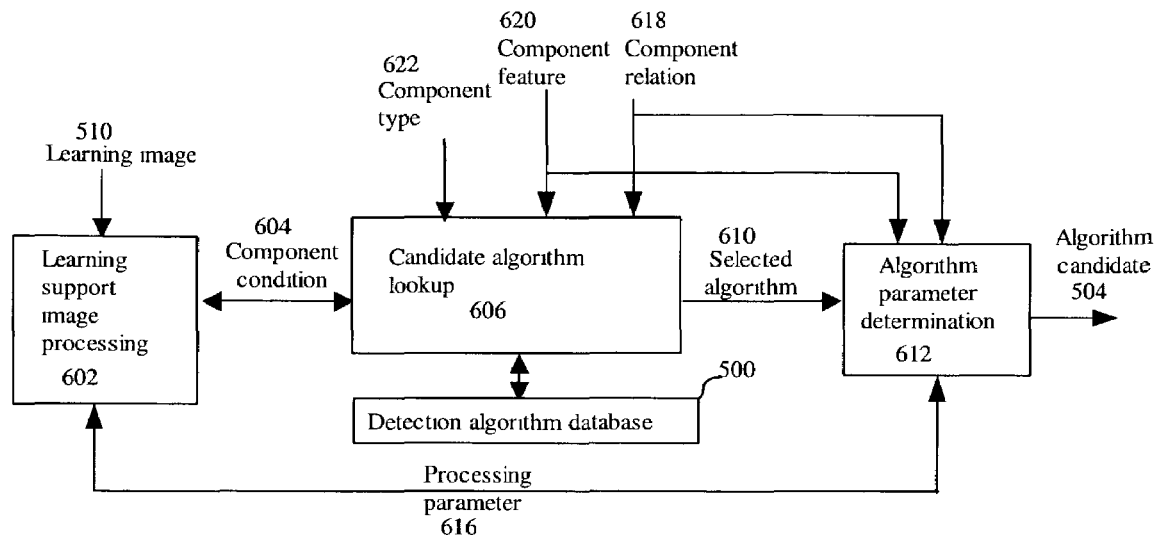
FIG. 6 shows a candidate algorithm generation module processing flow.

The candidate algorithm generation step 502 generates candidate algorithm 504 for scoring and selection. The candidate algorithm generation processing flow is shown in FIG. 6. It first determines candidate algorithm 606 by looking up the algorithm database 500 for the applicable algorithms based on the type of component 622, component features 620 and component relations 618 and other information stored in the reference CAT model. The algorithm database can be organized in a convenient way for efficient algorithm look up and selection. For example, the algorithm can be organized in a way that the fastest algorithm will be accessed first. In this case, the algorithm can be selected sequentially if a higher speed algorithm is desired over slower ones.

A learning support image processing step 602 is performed on a learning image 510 to determine additional information such as component conditions 604 (dark contrast, bright contrast, textural, etc.) that may be required to properly look up the detection algorithm database 500. In one embodiment of the invention, the structure-guided processing method disclosed in Lee, S, Oh, S, Huang, C "Structure-guided Image Processing and Image Feature Enhancement", U.S. patent application Ser. No. 09/738,846, filed Dec. 15, 2000 can be used for component condition determination.

Once an algorithm is selected 610, its parameters are determined by an algorithm parameter determination step 612. Most of the processing parameters 616 can be directly determined from the component specification of the reference CAT model. For example, the size of morphological processing structuring elements are either constant or are functions of the size of the components. Some parameters such as threshold values or histogram bounds are determined by the learning support image processing step that processes the learning image such as performing a histogram of the component region to derive the threshold values or the histogram parameters for the algorithm. The learning support image processing step also extracts image templates (single or multi-resolutions) to be used by the algorithm candidate 504. The selected algorithm along with its parameters are the resulting algorithm candidate 504 that is the output of this module.

IV.1.2.3 Candidate Algorithm Evaluation

Figure 7:
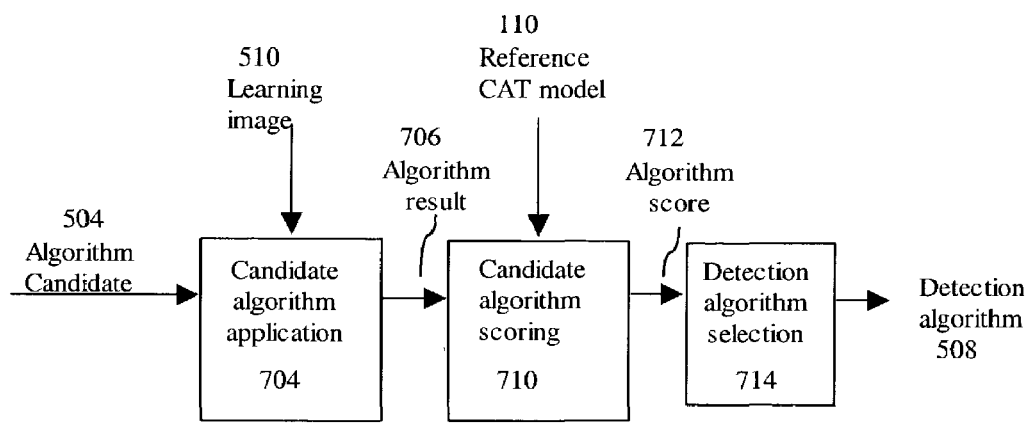
FIG. 7 shows a candidate algorithm evaluation module processing flow.

The candidate algorithms are evaluated by a candidate algorithm evaluation module 506 to select the appropriate detection algorithm for the component of interest. The processing flow of the candidate algorithm evaluation module 506 is shown in FIG. 7. The module applies the candidate algorithm 504 to the learning image(s) 510. The algorithm application results 706 are compared with the information stored in the reference CAT model 110 to generate an algorithm score 712 for the algorithm result. The algorithm scores are used by a detection algorithm selection step 714 to select the detection algorithm 508 for the current component.

In one embodiment of the invention, all candidate algorithms are applied and the one with the highest score is selected. In another embodiment of the invention, algorithms are sequentially applied from simplest to the most complicated. The first algorithm that has a score exceeding an algorithm score threshold is selected. In a third embodiment of the invention, processing time is considered in the detection algorithm selection process. Processing time can either be estimated and incorporated into the algorithm scores or the detection algorithm selection process could set an upper limit and exclude algorithms exceeding the limit.

The candidate algorithm scoring step 710 compares the detection algorithm results with the data in the reference CAT model 110 to generate a numerical score. In one embodiment of the invention, the score is generated from comparing the detected component mask with the reference mask stored in the reference CAT model 110. A simple score comparing of the image mask A with another image mask B can be calculated as $$\text{Mask\_Score} = 1 - \text{Area}(A \text{ .XOR. } B)/\text{Area}(A \text{ .OR. } B)$$

Where .XOR. is an exclusive OR operation; .OR. is an OR (Union) operation; Area(m) is a function that determines the area of the image mask m.

In another embodiment of the invention, the score is generated from comparing the detected component feature values with the reference feature values stored in the reference CAT model. A simple score comparing n feature values $F_1$–$F_n$ between set A and set B can be calculated as follows:

$$\text{Feature\_Score} = \frac{\sum_{i=1}^{n}(N_{Ai} - N_{Bi})^2}{n}$$

Where $N_{Ai}$ is the normalized feature $F_I$ for set A and where $N_{Bi}$ is the normalized feature $F_I$ for set B. In one embodiment of the implementation, the normalization can be performed by $$N_i = \frac{F_i - \mu_i}{\sigma_i}.$$

Where $\mu_I$ is the mean of $F_I$ and $\sigma_I$ is the standard deviation of $F_I$.

In a third embodiment of the invention, comparing the detected component mask and feature values with the reference mask and feature values generates the score. This can be accomplished by a weighted combination of the Mask_Score and Feature_Score to create a combined score. Such as:

$$\text{Combined\_score} = \alpha*\text{Mask\_Score} + (1-\alpha)*\text{Feature\_Score}$$

where $\alpha$ is a weighting factor between 0 and 1. Those skilled in the art should recognize that other methods could be used for algorithm scoring. For example, the processing time or computing and memory resource requirements can be used as another algorithm scoring factor.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

TABLE 1

ROI determination algorithms for some typical relationships

| Relations | Algorithm Procedure |
| --- | --- |
| Distance between centers of two components | Circle(d, c_p) $\oplus$ R_n $\oplus$ E |
| Adjacency: touching | B_p $\oplus$ R_n $\oplus$ D_m $\oplus$ E − B_p |
| Adjacency: overlapping | O_p $\oplus$ R_n $\oplus$ D_m $\oplus$ E |
| Inside | C_p $\oplus$ E |
| Outside | (I − C_p) $\oplus$ E |

Where
d: distance
c_p: center of the parent component
Circle (d, c_p): a circle of radius d and center c_p
$\oplus$: morphological dilation operation
R_n: expected bounding box region of the current component n
m: the maximum distance from a boundary to the center of the current component n
D_m: a disk of radius m TABLE 1-continued ROI determination algorithms for some typical relationships

| Relations | Algorithm Procedure |
|---|---|
| E: an error rectangle with x and y length corresponding to the expected detection error in x and y | |
| B_p: the boundary where the two components touching each other | |
| O_p: the region(s) where the two components overlapping each other | |
| C_p: the detected parent component region | |
| I: the valid image region | |

TABLE 2

Pre-processing Options for Algorithms to Detect Square or Rectangular Regions

Component Conditions

| Processing Types | Dark contrast | Bright contrast | Contrast reversal invariant | Textural |
|---|---|---|---|---|
| No Operation | No Operation | No Operation | No Operation | No Operation |
| Noise removal 1 | I_out = Median filter (I) | I_out = Median filter (I) | I_out = Median filter (I) | I_out = Median filter (I) |
| Noise removal 2 | I_out = Automatic filtering for dark region (I) using box calipers in Directions 1 and 2 | I_out = Automatic filtering for bright region (I) using box calipers in Directions 1 and 2 | I_out = Automatic filtering (I) using box calipers in directions 1 and 2 | I1 = I • E1_L1 − I ○ E1_L1<br>I2 = I • E2_L2 − I ○ E2_L2<br>I_3 = MAX(I1, I2)<br>I_out = Automatic filtering (I3) using box calipers in Directions 1 and 2 |

Where
I is the input image for the processing type;
I_out is the output image for the processing type;
Median filter (I) is a median filtering of I by a small size kernel such as 3 by 3;
Automatic filtering performs automatic filtering for feature enhancement as described in Lee et al, 2001;
Direction 1: the first side direction of the rectangular region;
Direction 2: the second side direction of the rectangular region. It is orthogonal to Direction 1;
E1_m is a elongated structuring element [Lee, 2000] of length m that is orthogonal to Direction 1;
E2_m is a elongated structuring element [Lee, 2000] of length m that is orthogonal to Direction 2;
L1 is a sufficiently large length such as half of the rectangle side length in Direction 1;
L2 is a sufficiently large length such as half of the rectangle side length in Direction 2;
⊖ is the grayscale morphological erosion operation [Sternberg, 1986];
⊕ is the grayscale morphological dilation operation;
○ is the grayscale morphological opening operation [Sternberg, 1986];
• is the grayscale morphological closing operation;
MAX(I1, I2) is performs maximum function between each pixel of images I1 and I2;
"No Operation" skip the pre-processing step.

TABLE 3

Feature Enhancement Options for Algorithms for Square or Rectangular Region

Component Conditions

| Processing Types | Dark contrast | Bright contrast | Contrast reversal invariant | Textural |
|---|---|---|---|---|
| No Operation | No Operation | No Operation | No Operation | No Operation |
| Edge enhancement | I1 = I ⊕ E1_r − I<br>I2 = I ⊕ E2_r − I<br>I_out = MAX(I1, I2) | I1 = I − I ⊖ E1_r<br>I2 = I − I ⊖ E2_r<br>I_out = MAX(I1, I2) | I1 = I ⊕ E1_r − I ⊖ E1_r<br>I2 = I ⊕ E2_r − I ⊖ E2_r<br>I_out = MAX(I1, I2) | If "Noise removal 2" is not applied, perform<br>I1 = I • E1_l − I ○ E1_l<br>I2 = I • E2_l − I ○ E2_l<br>I_3 = MAX(I1, I2)<br>Else<br>I_3 = I<br>I1 = I_3 ⊕ E1_r − I_3 ⊖ E1_r<br>I2 = I_3 ⊕ E2_r − I_3 ⊖ E2_r<br>I_out = MAX(I1, I2) |
| Caliper edge detection | I_out = differential filter edge detection using box calipers in Directions 1 and 2 | I_out = differential filter edge detection using box calipers in Directions 1 and 2 | I_out = differential filter edge detection using box calipers in Directions 1 and 2 | If "Noise removal 2" is not applied, perform<br>I1 = I • E1_l − I ○ E1_l<br>I2 = I • E2_l − I ○ E2_l<br>I_3 = MAX(I1, I2)<br>Else<br>I_3 = I |

TABLE 3-continued

Feature Enhancement Options for Algorithms for Square or Rectangular Region

| Processing Types | Component Conditions | | | |
|---|---|---|---|---|
| | Dark contrast | Bright contrast | Contrast reversal invariant | Textural |
| | | | | I_out = applied differential filter edge detection to I_3 using box calipers in Directions 1 and 2 |

Where r is a small length such as 7.

TABLE 4

Detection Options for Algorithms for Square or Rectangular Region

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Structuring element size and shape |
| Template matching | Fixed template | Template |
| | Rotation invariant | Template, rotation range |
| | Scale invariant | Template, scale factor |
| | Rotation and scale invariant | Template, rotation range, scale factor |

TABLE 5

Pre-processing for Algorithms to Detect Square Frame or Rectangular Frames

| Processing Types | Dark contrast | Bright contrast | Contrast reversal invariant |
|---|---|---|---|
| No Operation | No Operation | No Operation | No Operation |
| Noise removal 1 | I_out = Median filter (I) | I_out = Median filter (I) | I_out = Median filter (I) |
| Noise removal 2 | I_out = Automatic filtering for dark line (I) using box calipers in Directions 1 and 2 | I_out = Automatic filtering for bright line (I) using box calipers in Directions 1 and 2 | I_out = Automatic line filtering (I) using box calipers in directions 1 and 2 |

TABLE 6

Feature Enhancement for Algorithms to Detect Square Frames or Rectangular Frames

| Processing Types | Dark contrast | Bright contrast | Contrast reversal invariant |
|---|---|---|---|
| No Operation | No Operation | No Operation | No Operation |
| Line enhancement | $I1 = I \bullet E1\_r - I$ $I2 = I \bullet E2\_r - I$ I_out = MAX(I1, I2) | $I1 = I - I \circ E1\_r$ $I2 = I - I \circ E2\_r$ I_out = MAX(I1, I2) | $I1 = I \bullet E1\_r - I \circ E1\_r$ $I2 = I \bullet E2\_r - I \circ E2\_r$ I_out = MAX(I1, I2) |
| Caliper line detection | I_out = bandpass filter line detection using | I_out = bandpass filter line detection using | I_out = bandpass filter line detection using |

TABLE 6-continued

Feature Enhancement for Algorithms to Detect Square Frames or Rectangular Frames

| Processing Types | Dark contrast | Bright contrast | Contrast reversal invariant |
|---|---|---|---|
| | box calipers in Directions 1 and 2 | box calipers in Directions 1 and 2 | box calipers in Directions 1 and 2 |

TABLE 7

Detection for Algorithms to Detect Square Frames or Rectangular Frames

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Structuring element size and shape |
| Template matching | Fixed template | Template |
| | Rotation invariant | Template, rotation range |
| | Scale invariant | Template, scale factor |
| | Rotation and scale invariant | Template, rotation range, scale factor |

TABLE 8

Pre-processing Options for Algorithms to Detect Circular Region

| Processing Types | Component Conditions | | | |
|---|---|---|---|---|
| | Dark contrast | Bright contrast | Contrast reversal invariant | Textural |
| No Operation | No Operation | No Operation | No Operation | No Operation |
| Noise removal 1 | I_out = Median filter (I) | I_out = Median filter (I) | I_out = Median filter (I) | I_out = Median filter (I) |
| Noise removal 2 | I_out = Automatic filtering for dark region (I) using circle caliper centered in expected component | I_out = Automatic filtering for bright region (I) using circle caliper centered in expected component | I_out = Automatic filtering (I) using circle caliper centered in expected component center | $I\_3 = I \bullet D\_m - I \circ D\_m$ I_out = Automatic filtering (I3) using circle caliper centered in |

TABLE 8-continued

Pre-processing Options for Algorithms to Detect Circular Region

Component Conditions

| Processing Types | Dark contrast | Bright contrast | Contrast reversal invariant | Textural |
|---|---|---|---|---|
| | center location | center location | location | expected component center location |

Where
$D\_m$ is a circular structuring element of radius m;
m is a sufficiently large length such as half of the radius of the circle;

TABLE 9

Feature Enhancement Options for Algorithms to Detect Circular Region

Component Conditions

| Processing Types | Dark contrast | Bright contrast | Contrast reversal invariant | Textural |
|---|---|---|---|---|
| No Operation | No Operation | No Operation | No Operation | No Operation |
| Edge enhancement | I_out = I ⊕ D_r − I | I_out = I − I ⊖ D_r | I_out = I ⊕ D_r − I ⊖ D_r | If "Noise removal 2" is not applied, perform I_3 = I • D_m − I ∘ D_m Else I_3 = I I_out = I ⊕ D_r − I ⊖ D_r |
| Caliper edge detection | I_out = differential filter edge detection using a circle caliper centered in expected component center location | I_out = differential filter edge detection using a circle caliper centered in expected component center location | I_out = differential filter edge detection using a circle caliper centered in expected component center location | If "Noise removal 2" is not applied, perform I_3 = I • D_m − I ∘ D_m Else I_3 = I I_out = applied differential filter edge detection to I_3 using a circle caliper centered in expected component center location |

Where r is a small length such as 7.

TABLE 10

Detection Options for Algorithms to Detect Circular Region

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Circular structuring element size |
| Template matching | Fixed template | Template |
| | Scale invariant | Template, scale factor |

TABLE 11

Pre-processing Options for Algorithms to Detect Ring

| Processing Types | Dark contrast | Bright contrast | Contrast reversal invariant |
|---|---|---|---|
| No Operation | No Operation | No Operation | No Operation |
| Noise removal 1 | I_out = Median filter (I) | I_out = Median filter (I) | I_out = Median filter (I) |
| Noise removal 2 | I_out = Automatic filtering for dark region (I) using circle caliper centered in expected component center location | I_out = Automatic filtering for bright region (I) using circle caliper centered in expected component center location | I_out = Automatic filtering (I) using circle caliper centered in expected component center location |

TABLE 12

Feature Enhancement Options for Algorithms to Detect Ring

| Processing Types | Dark contrast | Bright contrast | Contrast reversal invariant |
|---|---|---|---|
| No Operation | No Operation | No Operation | No Operation |
| Edge enhancement | I_out = I • D_r − I | I_out = I − I ∘ D_r | I_out = I • D_r − I ∘ D_r |
| Caliper edge detection | I_out = bandpass filter edge detection using a circle caliper centered in expected component center location | I_out = bandpass filter edge detection using a circle caliper centered in expected component center location | I_out = bandpass filter edge detection using a circle caliper centered in expected component center location |

Where r is a small length such as 7.

TABLE 13

Detection Options for Algorithms to Detect Ring

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Circular structuring element size |
| Template matching | Fixed template | Template |
| | Scale invariant | Template, scale factor |

TABLE 14

Pre-Processing Options for Algorithms to Detect Arc Region

| Processing Types | Component Conditions | | | |
|---|---|---|---|---|
| | Dark contrast | Bright contrast | Contrast reversal invariant | Textural |
| No Operation | No Operation | No Operation | No Operation | No Operation |
| Noise removal 1 | I_out = Median filter (I) | I_out = Median filter (I) | I_out = Median filter (I) | I_out = Median filter (I) |
| Noise removal 2 | I_out = Automatic filtering for dark region (I) using arc caliper centered in expected component center location | I_out = Automatic filtering for bright region (I) using arc caliper centered in expected component center location | I_out = Automatic filtering (I) using arc caliper centered in expected component center location | I_3 = I • D_m − I ○ D_m  I_out = Automatic filtering (I3) using arc caliper centered in expected component center location |

Where
D_m is a circular structuring element of radius m;
m is a sufficiently large length such as half of the radius of the arc;

TABLE 15

Feature Enhancement Options for Algorithms to Detect Arc Region

| Processing Types | Component Conditions | | | |
|---|---|---|---|---|
| | Dark contrast | Bright contrast | Contrast reversal invariant | Textural |
| No Operation | No Operation | No Operation | No Operation | No Operation |
| Edge enhancement | I_out = I ⊕ D_r − I | I_out = I − I ⊖ D_r | I_out = I ⊕ D_r − I ⊖ D_r | If "Noise removal 2" is not applied, perform I_3 = I • D_m − I ○ D_m Else I_3 = I I_out = I ⊕ D_r − I ⊖ D_r |
| Caliper edge detection | I_out = differential filter edge detection using an arc caliper centered in expected component center location | I_out = differential filter edge detection using an arc caliper centered in expected component center location | I_out = differential filter edge detection using an arc caliper centered in expected component center location | If "Noise removal 2" is not applied, perform I_3 = I • D_m − I ○ D_m Else I_3 = I I_out = applied differential filter edge detection to I_3 using an arc caliper centered in expected component center location |

Where r is a small length such as 7.

TABLE 16

Detection Options for Algorithms to Detect Arc Region

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Circular structuring element size |
| Template matching | Fixed template | Template |
| | Scale invariant | Template, scale factor |

TABLE 17

Detection Options for Algorithms to Detect Arc

| Processing Types | Dark contrast | Bright contrast | Contrast reversal invariant |
|---|---|---|---|
| No Operation | No Operation | No Operation | No Operation |
| Noise removal 1 | I_out = Median filter (I) | I_out = Median filter (I) | I_out = Median filter (I) |
| Noise removal 2 | I_out = Automatic filtering for dark region (I) using arc caliper centered in expected component center location | I_out = Automatic filtering for bright region (I) using arc caliper centered in expected component center location | I_out = Automatic filtering (I) using arc caliper centered in expected component center location |

TABLE 18

Feature Enhancement Options for Algorithms to Detect Arc

| Processing Types | Dark contrast | Bright contrast | Contrast reversal invariant |
|---|---|---|---|
| No Operation | No Operation | No Operation | No Operation |
| Edge enhancement | I_out = I • D_r − I | I_out = I − I ○ D_r | I_out = I • D_r − I ○ D_r |
| Caliper edge detection | I_out = bandpass filter edge detection using an arc caliper centered in expected component center location | I_out = bandpass filter edge detection using an arc caliper centered in expected component center location | I_out = bandpass filter edge detection using an arc caliper centered in expected component center location |

Where r is a small length such as 7.

TABLE 19

Detection Options for Algorithms to Detect Arc

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Circular structuring element size |
| Template matching | Fixed template | Template |
| | Scale invariant | Template, scale factor |

TABLE 20

Pre-processing Options for Algorithms
to Detect Arbitrary Shaped Region

Component Conditions

| Processing Types | Dark contrast | Bright contrast | Contrast reversal invariant | Textural |
|---|---|---|---|---|
| No Operation | No Operation | No Operation | No Operation | No Operation |
| Noise removal 1 | I_out = Median filter (I) | I_out = Median filter (I) | I_out = Median filter (I) | I_out = Median filter (I) |
| Noise removal 2 | I_out = Automatic filtering for dark region (I) using arbitrary shape caliper centered in expected component center location | I_out = Automatic filtering for bright region (I) using arbitrary shape caliper centered in expected component center location | I_out = Automatic filtering (I) using arbitrary shape caliper centered in expected component center location | I_3 = I • D_m - I ○ D_m I_out = Automatic filtering (I3) using arbitrary shape caliper centered in expected component center location |

Where
D_m is a circular structuring element of radius m;
m is a sufficiently large length such as half of the radius of the arc;

TABLE 21

Feature Enhancement Options for
Algorithms to Detect Arbitrary Shaped Region

Component Conditions

| Processing Types | Dark contrast | Bright contrast | Contrast reversal invariant | Textural |
|---|---|---|---|---|
| No Operation | No Operation | No Operation | No Operation | No Operation |
| Edge enhancement | I_out = I ⊕ D_r - I | I_out = I - I ⊖ D_r | I_out = I ⊕ D_r - I ⊖ D_r | If "Noise removal 2" is not applied, perform I_3 = I • D_m - I ○ D_m Else I_3 = I I_out = I ⊕ D_r - I ⊖ D_r |
| Caliper edge detection | I_out = differential filter edge detection using an arbitrary shape caliper centered in expected component center location | I_out = differential filter edge detection using an arbitrary shape caliper centered in expected component center location | I_out = differential filter edge detection using an arbitrary shape caliper centered in expected component center location | If "Noise removal 2" is not applied, perform I_3 = I • D_m - I ○ D_m Else I_3 = I I_out = applied differential filter edge detection to I_3 using an arbitrary shape caliper centered in expected component center location |

Where r is a small length such as 7.

TABLE 22

Detection Options for Algorithms to Detect Arbitrary Shaped Region

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Circular structuring element size |
| Template matching | Fixed template | Template |
| | Scale invariant | Template, scale factor |

TABLE 23

Pre-processing Options for Algorithms
to Detect Arbitrary Shaped Boundary Frame

| Processing Types | Dark contrast | Bright contrast | Contrast reversal invariant |
|---|---|---|---|
| No Operation | No Operation | No Operation | No Operation |
| Noise removal 1 | I_out = Median filter (I) | I_out = Median filter (I) | I_out = Median filter (I) |
| Noise removal 2 | I_out = Automatic filtering for dark region (I) using arbitrary shape caliper centered in expected component center location | I_out = Automatic filtering for bright region (I) using arbitrary shape caliper centered in expected component center location | I_out = Automatic filtering (I) using arbitrary shape caliper centered in expected component center location |

TABLE 24

Feature Enhancement Options for Algorithms
to Detect Arbitrary Shaped Boundary Frame

| Processing Types | Dark contrast | Bright contrast | Contrast reversal invariant |
|---|---|---|---|
| No Operation | No Operation | No Operation | No Operation |
| Edge enhancement | I_out = I • D_r - I | I_out = I - I ○ D_r | I_out = I • D_r - I ○ D_r |
| Caliper edge detection | I_out = bandpass filter edge detection using an arbitrary shape caliper centered in expected component center location | I_out = bandpass filter edge detection using an arbitrary shape caliper centered in expected component center location | I_out = bandpass filter edge detection using an arbitrary shape caliper centered in expected component center location |

Where r is a small length such as 7.

TABLE 25

Detection Options for Algorithms
to Detect Arbitrary Shaped Boundary Frame

| Processing Types | Approach | Processing Parameters |
|---|---|---|
| No Operation | NA | NA |
| Thresholding | Fixed value | Threshold value, Condition (>, >=, <, <=) |
| | Adaptive | Histogram lower bound percentage, Histogram higher bound percentage |
| | Dynamic | Circular structuring element size |

TABLE 25-continued

Detection Options for Algorithms
to Detect Arbitrary Shaped Boundary Frame

| Processing Types | Approach | Processing Parameters |
|---|---|---|
| Template matching | Fixed template | Template |
| | Scale invariant | Template, scale factor |

What is claimed is:

1. An object detection learning method comprises the following steps:
   (a) inputting a reference CAT model containing the basic structure and component feature values of an ideal subject and its tolerance ranges wherein each node of the reference CAT model specifies its expected CAT component types, expected CAT component features and expected CAT component relations and reference mask;
   (b) inputting at least one learning image;
   (c) inputting a detection algorithm database containing multiple detection algorithms for incorporation into the detection sequence of a CAT node;
   (d) performing candidate algorithm generation using the detection algorithm database based on the type of component, component features and component relations stored in the reference CAT model having an candidate algorithm output;
   (e) performing candidate algorithm evaluation using the candidate algorithm output to select the appropriate detection algorithm for the component of interest having a detection algorithm output wherein the candidate algorithm evaluation step further comprises the following steps:
      (i) performing candidate algorithm application using the at least one learning image and the algorithm candidate output having an algorithm result output containing detected component mask;
      (ii) performing candidate algorithm scoring using the reference CAT model and the algorithm result output containing detected component feature values having an algorithm score output;
      (iii) performing detection algorithm selection using the algorithm score output having a detection algorithm output.

2. The method of claim 1 wherein the candidate algorithm scoring step uses the reference mask stored in the reference CAT model and the detected component mask in the algorithm result output to generate a mask score in the algorithm score output.

3. The method of claim 1 wherein the candidate algorithm scoring step uses the component feature values stored in the reference CAT model and the detected component feature values in the algorithm result to generate at least one feature score in the algorithm score output.

* * * * *